(12) United States Patent
Stern et al.

(10) Patent No.: US 8,720,871 B2
(45) Date of Patent: May 13, 2014

(54) DUAL-HINGED SPRING

(75) Inventors: Hezi Stern, Ramat Gan (IL); Uri Weinstein, Ramat Gan (IL)

(73) Assignee: BabyRoo Ltd., Ramat Gan (IL)

( * ) Notice: Subject to any disclaimer, the term of this patent is extended or adjusted under 35 U.S.C. 154(b) by 48 days.

(21) Appl. No.: 13/262,766

(22) PCT Filed: Mar. 25, 2010

(86) PCT No.: PCT/IL2010/000259
§ 371 (c)(1),
(2), (4) Date: Oct. 3, 2011

(87) PCT Pub. No.: WO2010/113152
PCT Pub. Date: Oct. 7, 2010

(65) Prior Publication Data
US 2012/0025576 A1 Feb. 2, 2012

Related U.S. Application Data

(60) Provisional application No. 61/165,919, filed on Apr. 2, 2009.

(51) Int. Cl.
*F16F 1/20* (2006.01)
(52) U.S. Cl.
USPC ........... 267/164; 267/133; 267/165; 297/312; 297/452.49
(58) Field of Classification Search
USPC ............. 188/372; 267/36.1, 42, 43, 133, 164, 267/142, 145, 179, 260, 261, 165, 47, 109, 267/144; 297/452.49, 312; 5/236.1, 237, 5/247, 255, 719
See application file for complete search history.

(56) References Cited

U.S. PATENT DOCUMENTS

| | | | | |
|---|---|---|---|---|
| 104,718 | A * | 6/1870 | Elliot | 267/261 |
| 122,111 | A | 12/1871 | Duffy | |
| 155,723 | A * | 10/1874 | Hansell | 267/43 |
| 194,189 | A * | 8/1877 | Sweezy | 267/131 |
| 218,372 | A * | 8/1879 | Emery | 267/42 |
| 670,273 | A * | 3/1901 | Falkenhainer | 267/28 |
| 724,421 | A * | 4/1903 | Armstrong | 267/42 |
| 1,140,478 | A * | 5/1915 | Phillips | 188/129 |

(Continued)

FOREIGN PATENT DOCUMENTS

| | | |
|---|---|---|
| DE | 16738 | 1/1882 |
| DE | 73356 | 2/1894 |

(Continued)

OTHER PUBLICATIONS

International Search Report; International Application No.; PCT/IL2010/000259; International Filing Date; Mar. 25, 2010; Date of Mailing: Apr. 8, 2010; 5 pages.

*Primary Examiner* — Robert A Siconolfi
*Assistant Examiner* — Charles Poon
(74) *Attorney, Agent, or Firm* — Blue Filament Law PLLC; Avery N. Goldstein

(57) ABSTRACT

A dual-hinged spring assembly. One assembly comprises two elastomeric arcs including an upper arc having downward ends, and a lower arc having upward ends, the upward ends of the lower arc being movably connected to the downward ends of the upper arc, thereby forming an ovoid spring. Further, when the lower arc is secured against a supporting surface, pressure against the upper arc causes the dual-hinge spring to compress.

18 Claims, 6 Drawing Sheets

(56) References Cited

U.S. PATENT DOCUMENTS

| | | | | |
|---|---|---|---|---|
| 1,281,445 A | * | 10/1918 | Weaver | 267/42 |
| 1,876,924 A | * | 9/1932 | Hastings et al. | 267/261 |
| 2,558,151 A | * | 6/1951 | Parke | 267/133 |
| 2,856,988 A | * | 10/1958 | Kennard et al. | 267/109 |
| 4,736,932 A | * | 4/1988 | Haslim | 188/83 |
| 5,102,107 A | * | 4/1992 | Simon et al. | 267/152 |
| 2005/0283908 A1 | * | 12/2005 | Wong et al. | 5/109 |
| 2013/0228959 A1 | * | 9/2013 | Bock | 267/80 |

FOREIGN PATENT DOCUMENTS

| | | |
|---|---|---|
| DE | 75859 | 7/1894 |
| DE | 9415348 | 1/1995 |
| JP | 3195503 A | 8/1991 |

\* cited by examiner

DUAL-HINGED SPRING

CROSS REFERENCE TO RELATED APPLICATIONS

This application is a National Stage Application claiming priority to Israeli Application No. PCT/IL2010/000259, filed on Mar. 25, 2010, which claims priority to U.S. Provisional Application No. 61/165,919 filed on Apr. 2, 2009, and all the benefits accruing therefrom under 35U.S.C. §119, the contents of both, which are incorporated herein by reference in their entirety.

BACKGROUND

1. Technical Field

The present invention relates to the field of springs, and more particularly, to springs that include dual-hinges.

2. Discussion of Related Art

Physical movement is becoming recognized as an essential aid in development and maintenance of cognition:

"Cross-sectional studies have found a variety of cognitive function measures to be associated with various aspects of physical performance."

"Cognitive Function, Gait Speed Decline, and Comorbidities: The Health, Aging and Body Composition Study"; Hal H. Atkinson, et al; *The Journals of Gerontology Series A: Biological Sciences and Medical Sciences* 62:844-850 (2007) ©2007 The Gerontological Society of America In fact there are many who advocate that even maintaining movement in an office setting enhances performance:

"The human body is far from happy to sit still all the time! It is designed for movement" even during sitting. Using a seat that allows "hips, thighs and back [to] move . . . in the chair," results in "fewer occupational injuries and a better work environment, fewer days off sick and greater profitability for the companies as a result."

"The Importance of Mobility"; Lotta Jonson; Kinnarps Magazine—No. 7

The importance of movement in cognitive abilities, according to many sources, appears to be a foundation upon which a child and a young adult will be better able to receive and internalize information:

"The students' 'workplace' has to receive much more attention in terms of . . . ergonomic seating", meaning seats that allow movement of hips, thighs, and back.

"What the 'classroom of the future' will look like", Dr Dieter Breithecker Bundesarbeitsgemeinschaft für Haltungs—and Bewegungsförderung e. V. (Federal Working Group for Posture and Mobilization Support—Germany), 2005. (www.haltungundbewegung.de)

In addition to the above-noted advantage for adults and children to move to improve cognitive abilities, maintaining a baby in a rocking movement while in the embrace of a caregiver is known to calm the baby.

U.S. Pat. No. 5,411,315 (Greenwood) teaches a chair which moves in cyclic vertical movements while supporting an adult and infant.

A device in which the baby is placed in a bouncing chair and left alone is seen in Target.com's "Back to Nature Remote Control Bouncer" which is sold over the Internet (www.target.com).

BRIEF SUMMARY

Embodiments of the present invention provide a dual-hinged spring assembly. One assembly comprises two elastomeric arcs including an upper arc having downward ends, and a lower arc having upward ends, the upward ends of the lower arc being movably connected to the downward ends of the upper arc, thereby forming an ovoid spring. Further, when the lower arc is secured against a supporting surface, pressure against the upper arc causes the dual-hinge spring to compress.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
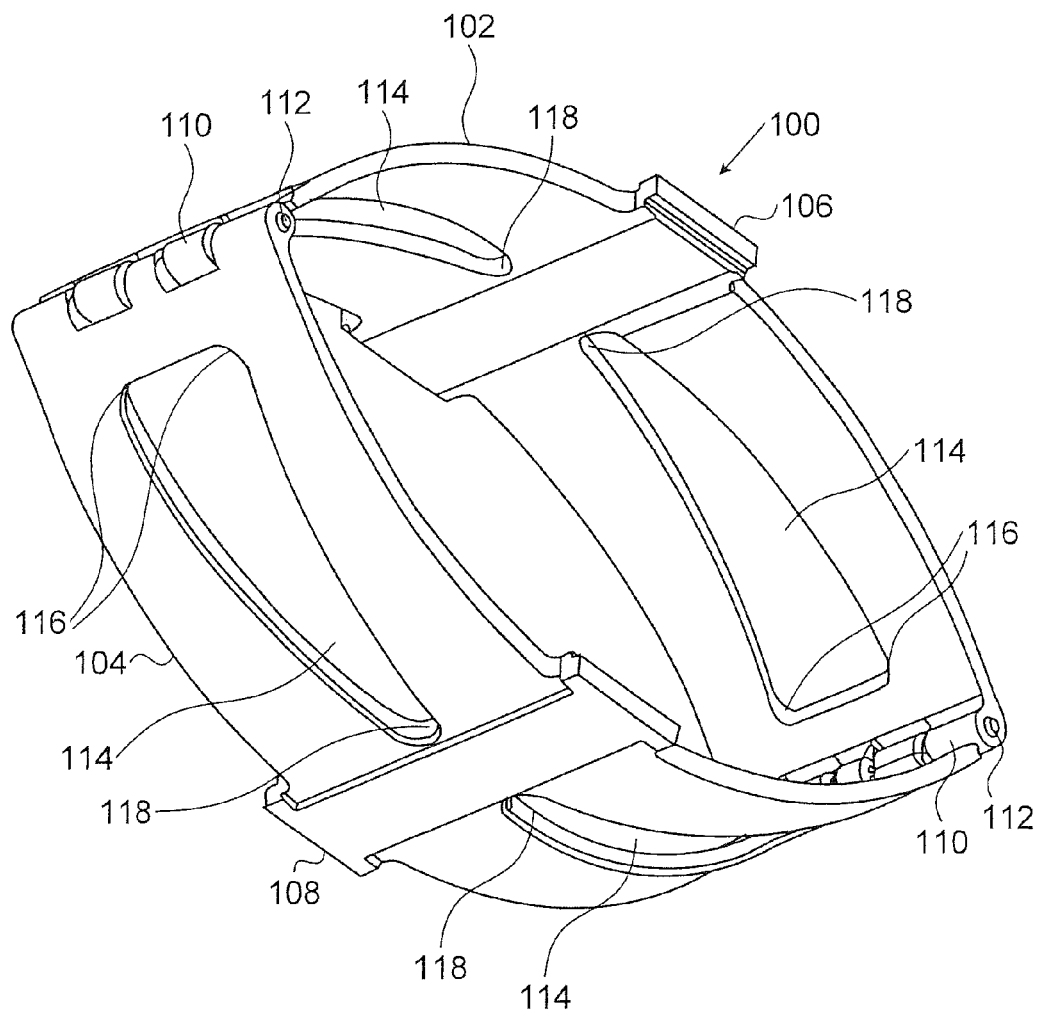
FIG. 1 shows a dual-hinged spring, according to embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 shows a dual-hinged spring 100 comprising an upper arc 102 and a lower arc 104. The ends of upper arc 102 curve towards the ends of lower arc 104 and are movably joined together by a hinge including a pin 112.

As used herein, the term "hinge" refers to a jointed or flexible device that allows the turning or pivoting of a part. Examples of "hinges", as used herein refer to; inter alia, a pin hinge; a living hinge; and a strap hinge.

Further as used herein the term "hinged" refers to attaching with hinges or a hinge.

Dual-hinged spring 100 additionally includes an upper seating area 106 and a lower seating area 108. Seating areas 106 and 108 are optionally used to connect dual-hinged spring 100 to a seat, as will be seen and explained below.

Dual-hinged spring 100 additionally includes triangular cutouts 114. Triangular cutouts 114 include base-curved areas 116 which are proximate to two hinges 110. Triangular cutouts 114 additionally include an apex-curved area 118 which is proximate to seating areas 106 or 108.

Figure 2:
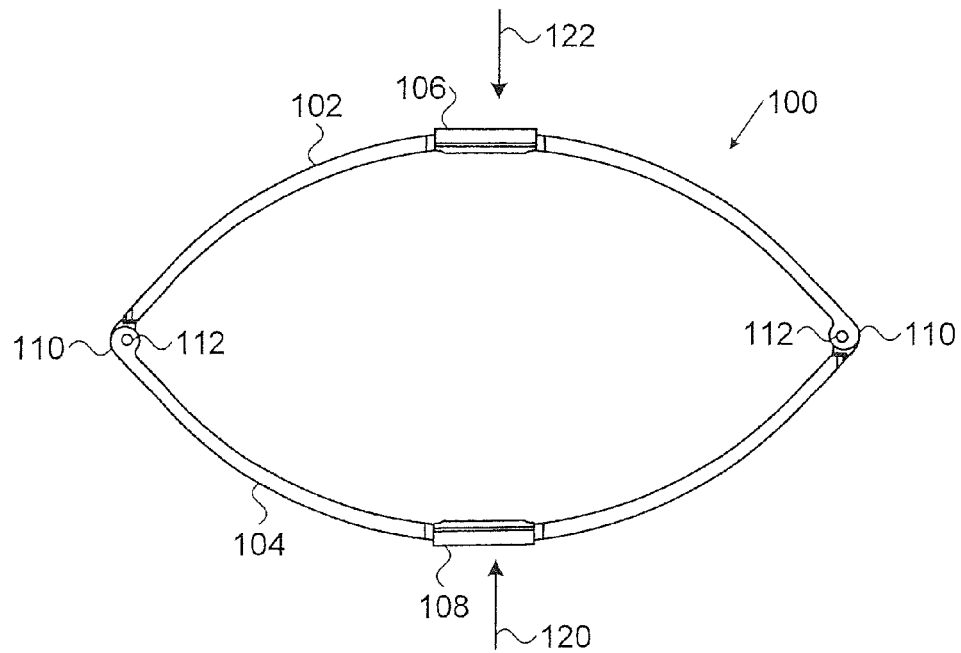
FIG. 2 shows a side view the dual-hinged spring shown in FIG. 1 in a non-compressed state, according to embodiments of the present invention.

FIG. 2 shows a side view of dual-hinged spring 100, in which upper arc 102 and lower arc 104 are in a non-stressed state and therefore maintain non-stressed curvatures.

Figure 3:
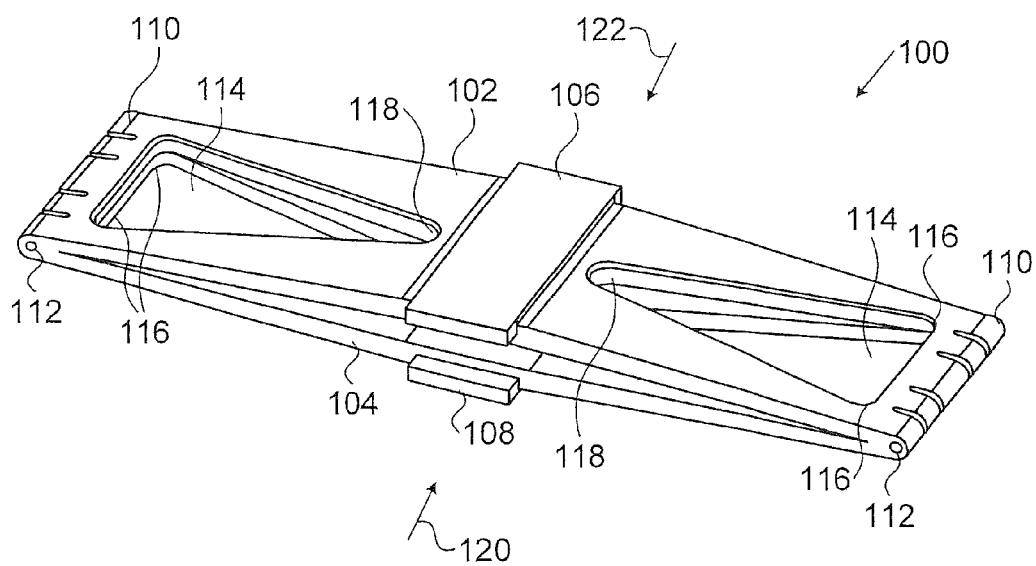
FIG. 3 shows the dual-hinged spring shown in FIG. 1 in a compressed state, according to embodiments of the present invention.

FIG. 3 shows a plan view of dual-hinged spring 100 in a compressed state in which a first force is applied in a downward direction 122 and a second force is applied in an upward direction 120.

As will be seen and explained further, lower seating area 108 is optionally stabilized against a support surface, for example of base of a chair; and upper seating area 106 is attached to the lower surface of a seat. In this manner, a person sitting on the seat can create cyclic compression in dual-hinged spring 100, thereby causing, inter alia, a vertical rocking motion in the seat.

To create the spring action of dual-hinged spring 100, there are variety of materials that can be utilized to maintain arcs 102 and 104 in the non-compressed state as seen in FIG. 2, and to create a cyclic action between the uncompressed state shown in FIG. 2 and a compressed state shown in FIG. 3.

In some embodiments, the materials utilized in dual-hinged spring 100 are elastomeric and include one or more materials selected from a group consisting of: polyolefin, polyethylene, polytetrafluoroethylene, polycarbonate synthetic, polyurethane, fluorinated polyolefin, chlorinated polyolefin, polyamide, acrylate polymer, acrylamide polymer, vinyl polymer, polyacetal, polycarbonate, polyether, aromatic polyester, polyether ether keton, polysulfone, silicone rubber, thermoset material, polyester, and/or combinations thereof.

In some embodiments, the materials utilized in dual-hinged spring 100 are selected from the group of materials including: nitinol, stainless steel shape memory materials, metals, synthetic biostable polymer, natural polymer, inorganic material, titanium, pyrolytic carbon, plastic, titanium mesh, and polydimethylsiloxane.

It should be noted that all of the materials listed above, when utilized for a chair in which a caregiver comforts a baby; optimally have a thickness that promotes an amplitude of movement of the dual hinge springs to between an amplitude of about 1 cm to about 8 cm that may provide a calming effect and/or greater cognitive abilities.

Additionally all of the materials above, when utilized for a chair in which a caregiver comforts a baby; are configured to have a frequency of between about 1.0 Hz and 2.2 hertz. The inventors have discovered that the above-noted amplitude and the above-noted frequency may provide optimal comfort to a child held in the arms of a caregiver.

It should be noted also that alternative amplitudes and frequency may be required for students in a classroom, or professionals such as secretaries at their desks.

It is also postulated by the inventors that during pregnancy use of hinged spring 100 may provide comfort to the fetus in the stomach.

The many frequencies and amplitudes that can be provided for dual hinged frame 100 that may provide calming or cognitive benefit are well known to those who are familiar with the art and the above-noted frequencies and amplitudes are not considered limiting in any way in these invention.

Figure 4:
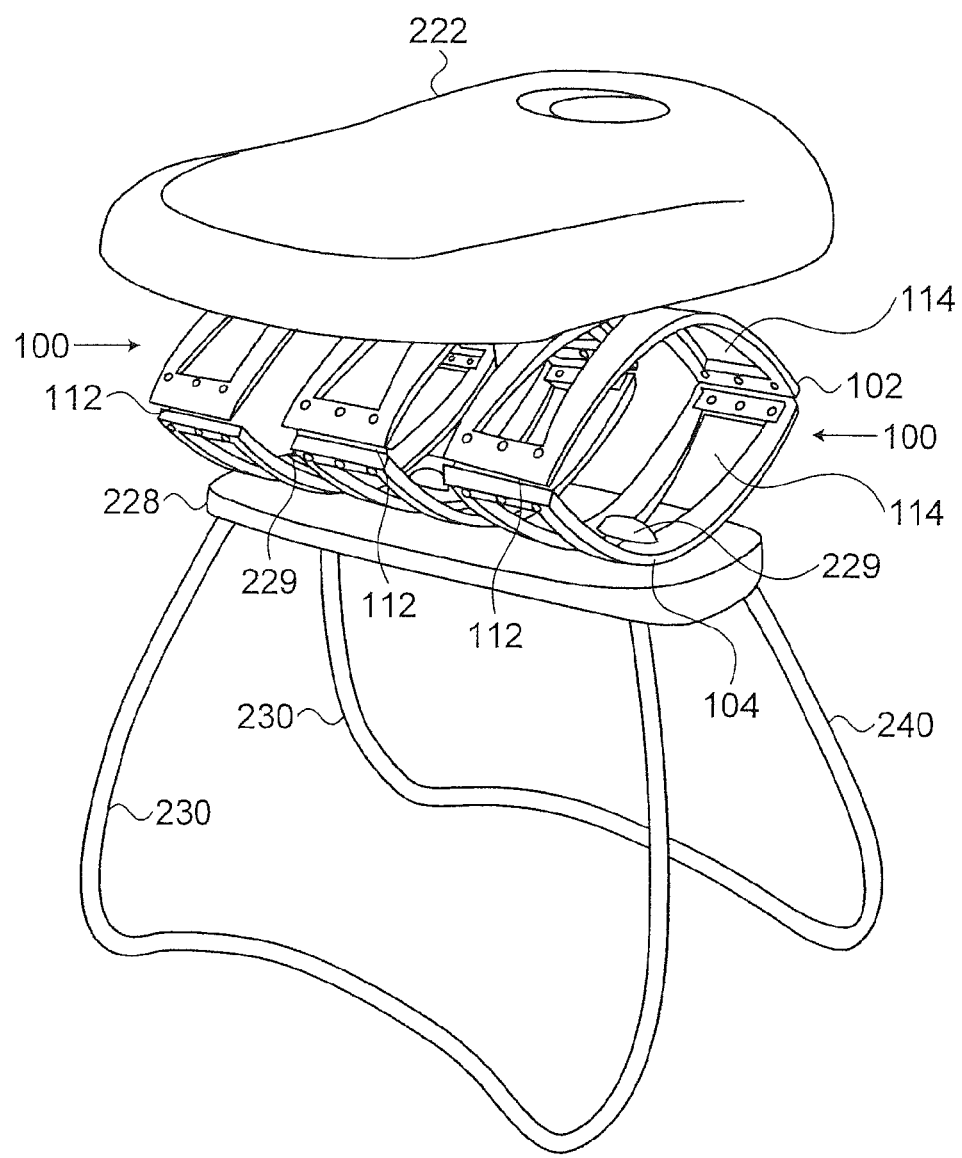
FIG. 4 shows a group of the dual-hinged springs shown in FIG. 1 in a seat arrangement, according to embodiments of the present invention.

FIG. 4 shows a group of dual-hinged springs 100 utilized in a seat arrangement including a seating surface 222 and a support surface 228. Support surface 228 is supported above the floor by a support frame 230. Additionally the assembly of multiple dual-hinged springs is held in place on support surface 228 by levers 229.

While three dual-hinged springs 100 are shown, it should be understood that there may be more dual-hinged springs 100 utilized with a seat 240, for example four to eight dual-hinged springs 100. Alternatively, seat 240 may be equipped with one or two dual-hinged springs 100.

Additionally, while the seating arrangement is shown with a built-in assembly of multiple dual-hinged springs 100, alternative assemblies provide portable assemblies of dual-hinged springs 100, and a variety of seating configurations, of which just a few will be presented.

Additionally dual hinged springs 100 may be standalone such that a user can place the dual hinged screen 100 on a floor, a rock outcropping or a seat and may benefit the use from the bouncing effect. For example the dual hinged spring shown in FIG. 7 may be placed on a couch or on the floor or any other seating surface and provide a calming and/or cognitive enhancement. The many uses of dual hinged spring 100 will be readily recognized by those familiar with the art.

The many structures in which dual-hinged springs 100 and or assemblies of dual-hinged springs 100 may be utilized are well known to those familiar with the art.

Figure 5A:
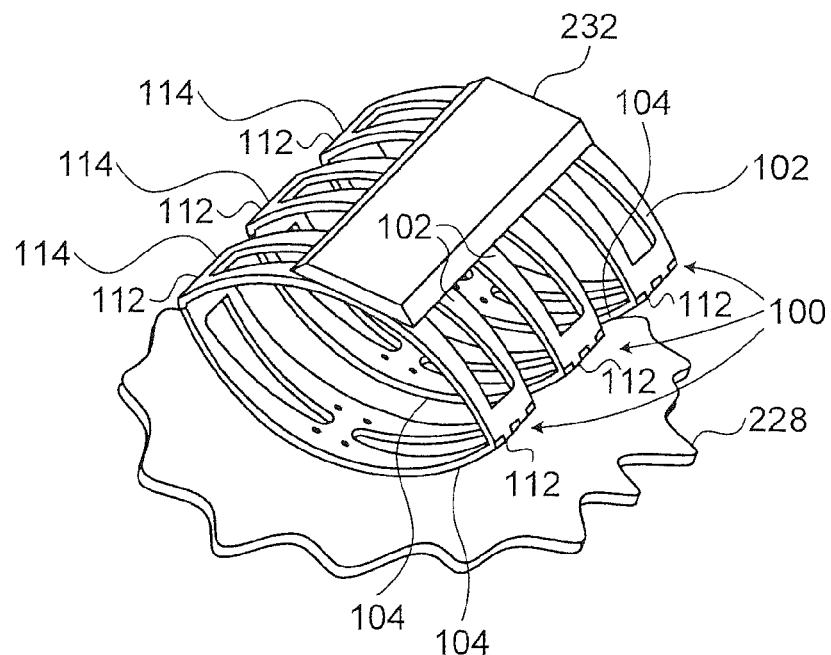
FIGS. 5A and 5B show details of the mounting of the multiple dual-hinged springs shown in FIG. 1 for a seating assembly, according to embodiments of the present invention.
Figure 5B:
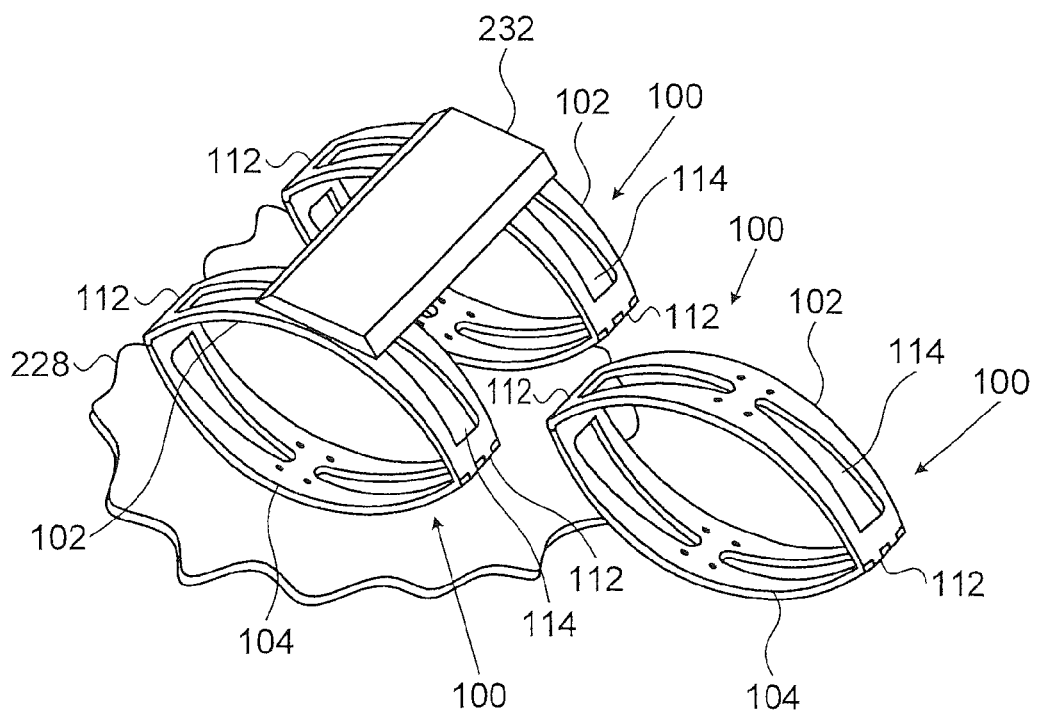

FIGS. 5A and 5B show details of an optional mounting of multiple dual-hinged springs 100 for a seating assembly. In this embodiment, a coupling 232 is utilized to maintain dual-hinged springs 100 in alignment as seen in FIG. 5A. As seen in FIG. 5B in an optional embodiment, one dual-hinged spring 100 may be removed from coupling 232, as might be the case when a lightweight individual is utilizing dual-hinged springs 100 on support surface 228.

Figure 6:
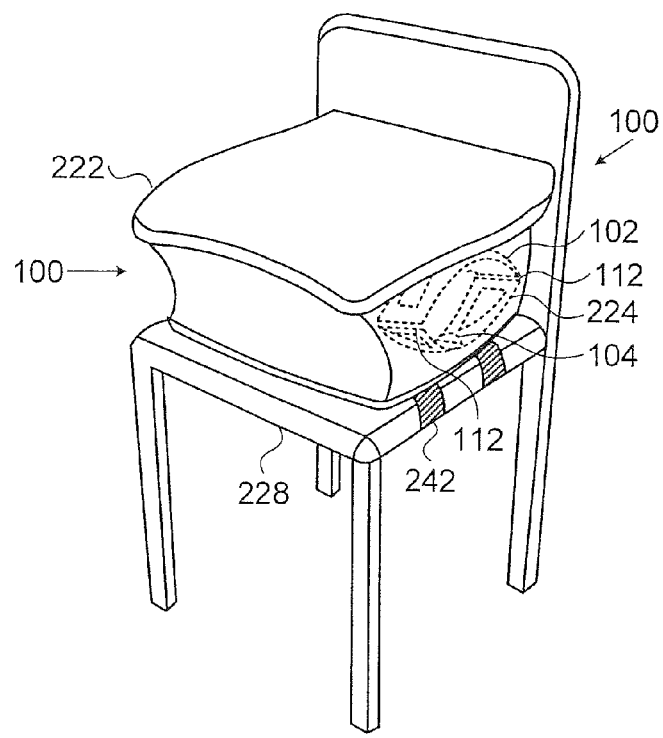
FIG. 6 shows an embodiment of the dual-hinged spring shown in FIG. 1, encased in a flexible encasement, according to embodiments of the present invention.

FIG. 6 shows an optional embodiment wherein dual-hinged springs 100 are encased in a flexible encasement 224; which is attached to support surface 228 with straps 242.

Figure 7:
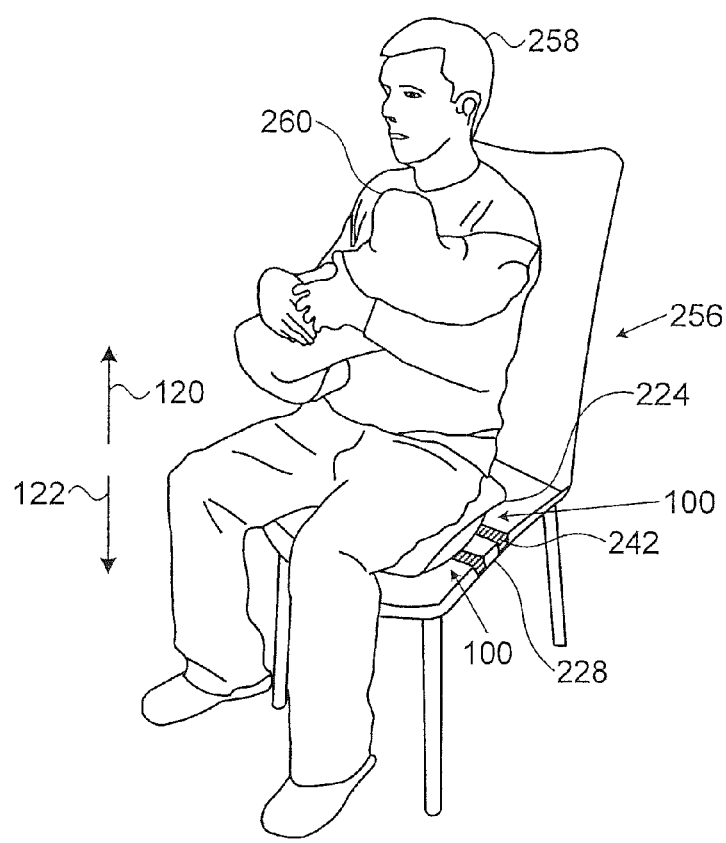
FIG. 7 shows a portable assembly of dual-hinged springs shown in FIG. 6, demonstrating use in a chair assembly, according to embodiments of the present invention.

FIG. 7 shows a portable assembly of dual-hinged springs 100 enclosed in flexible encasement 224 that has been strapped to a chair 256 with straps 242.

A caregiver 258 is sitting on the portable assembly of dual-hinged springs 100 and utilizing his feet to move up in direction 120, while the weight of caregiver 258 clauses the assembly of dual-hinged springs 100 to move downward in direction 122.

The movement interactions 122 and 120 cause dual-hinged springs 100 to substantially duplicate the uncompressed and compressed states of dual-hinged springs 100 shown in FIGS. 2 and 3.

By providing this cyclic motion, caregiver 258 provides a calming effect on a baby 260.

Figure 8A:
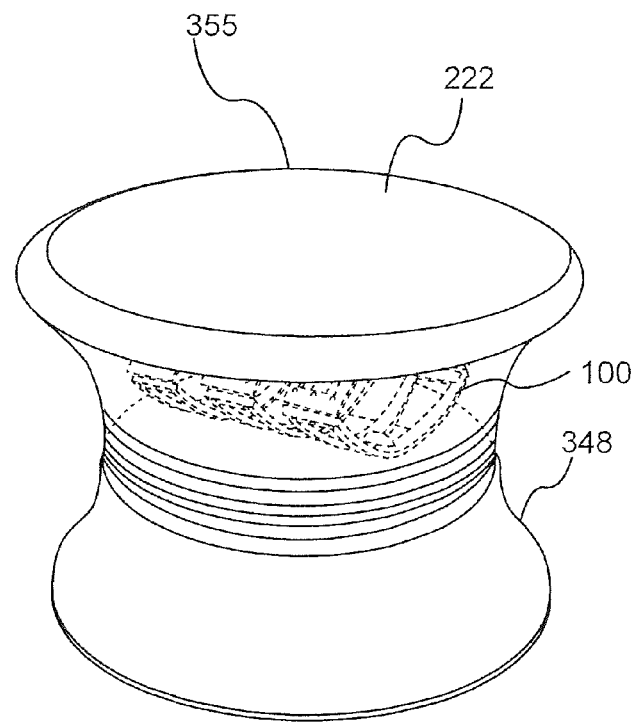
FIGS. 8A-8B show an alternative use of the dual-hinged springs shown in FIG. 7, according to embodiments of the present invention.
Figure 8B:
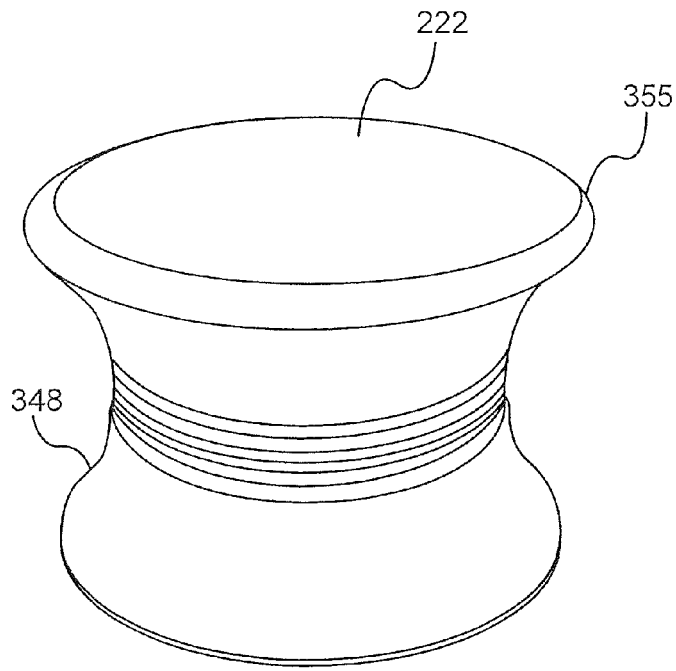

FIGS. 8A-8B show an embodiment of dual dual-hinged springs 100 which are utilized in a backless seat 355 that includes round seating surface 222 and a round support area 348.

Dimensions

In some embodiments, a substantial portion of arcs 102 and 104 (FIG. 1) of dual-hinged springs 100 have a thickness of at least about 4 millimeters. In some embodiments, a substantial portion of the spring assembly has a thickness of no more than about 0.5 millimeters.

In some embodiments, dual-hinged springs have a width of about between 60 millimeters and 120 millimeters.

In some embodiments, the length of dual-hinged spring 100 in the non-compressed configuration (FIG. 2) is between 200 and 350 millimeters.

In some embodiments, the height of dual-hinged spring 100 in an uncompressed state is between 80 and 200 millimeters.

In the above description, an embodiment is an example or implementation of the inventions. The various appearances of "one embodiment", "an embodiment", or "some embodiments", do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment", or "other embodiments", means that a particular feature, structure, or characteristic described in connection with the embodiments is included in at least some embodiments, but not necessarily all embodiments, of the inventions.

It is to be understood that the phraseology and terminology employed herein are not to be construed as limiting, and are for descriptive purposes only.

The principles and uses of the teachings of the present invention may be better understood with reference to the accompanying description, Figures, and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting", and grammatical variants thereof do not preclude the addition of one or more components, features, steps, or integers; or groups thereof, and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques, and procedures by practitioners of the art to which the invention belongs.

The descriptions, examples, methods, and materials presented in the claims and the specification are not to be construed as limiting, but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A dual-hinged spring assembly, comprising:
   two elastomeric arcs including:
     an upper arc having downward ends; and
     a lower arc having upward ends, the upward ends of the lower arc being movably connected to the downward ends of the upper arc, wherein the upper arc and lower arc each defining embedded therein—two triangular equilateral openings having a base with curved corners proximal to and parallel with the hinge, terminating in a curved apex proximal to the arc's center, thereby forming an ovoid spring, such that when the lower arc is secured against a supporting surface, pressure against the upper arc causes the dual-hinge spring to compress.

2. The assembly according to claim 1, wherein the rotatable connection between: the downward ends of the upper arc; and the upward ends of the lower arc comprise at least one of: a pin hinge; a living hinge; a strap hinge.

3. The assembly according to claim 2, wherein the upper arc and lower arc each include a connecting element between the apices of the triangular openings, the connecting elements having axis parallel to the bases of the triangular openings and serve to connect the spring assembly to a seat.

4. The assembly according to claim 3, wherein the lower connecting element is configured to connect to the upper surface of a supporting surface comprising a seat base and the upper connecting element is configured to connect to the underside of a seating surface such that the seating surface acts as a spring in reaction to cyclic downward pressure on the seating surface.

5. The assembly according to claim 4, wherein at least one of the upper connecting element and the lower connecting element are removably connected to their respective seating surfaces.

6. The assembly according to claim 5, including multiple dual-hinged springs assembled in parallel configurations, each dual-hinged spring assembly having at least one connecting element affixed to upper surface of the seat base and at least one upper connecting element affixed to the lower surface of the seating surface such that the seating surface moves downwardly in reaction to pressure on the seating surface.

7. The assembly according to claim 6, wherein the dual hinged springs are configured to respond to intermittent cyclic pressure with an amplitude of movement of between about 1 cm to about 8 cm.

8. The assembly according to claim 6, wherein the dual hinged springs are configured to respond to intermittent cyclic pressure with a frequency of between about 1.0 Hz and 2.2 hertz.

9. A dual-hinged spring assembly, comprising:
an elastomeric upper arc having an upper apogee including an upper connecting element configured to connect the upper arc to a seat, the elastomeric upper arc including:
a first upper strut assembly extending in a first direction from the upper connecting element and ending in a first downward upper base end; and
a second upper strut assembly extending in a second direction from the upper connecting element and ending in a second downward upper base end; and
an elastomeric lower arc having a lower apogee including a lower connecting element configured to connect the lower arc to a supporting portion of a seat, the elastomeric lower arc including:
a first lower strut assembly extending in the first direction from the lower connecting element and ending in a first upward lower base end which is rotatably connected to the first downward upper base end; and
a second lower strut assembly extending in the second direction from the lower connecting element and ending in a second upward lower base end which is rotatably connected to the second downward upper base end,
wherein the upper arc and lower arc, each defining embedded therein two triangular equilateral openings having a base with curved corners proximal to and parallel with the hinge, terminating in a curved apex proximal to the arc's center, such that when the lower connecting element is secured in position against a stabilizing surface, downward pressure against the upper connecting element causes compression of the dual-hinged spring.

10. The assembly according to claim 9, wherein the first upper strut assembly; the second upper strut assembly; the first lower strut assembly; and the second lower strut assembly, each strut assembly having a triangular cutout having an apex proximate to the lower connecting element.

11. The assembly according to claim 9, wherein the rotatable connections between: the first downward upper base end and the first upward lower base end; and the second downward upper base end and the second upward lower base end comprise at least one of: a pin hinge; a living hinge; a strap hinge.

12. The assembly according to claim 11, further including an array of the dual-hinged spring assemblies in parallel configurations, each dual-hinged spring assembly having lower connecting elements attached to the upper surface of a seat base, and multiple upper connecting elements connected to the lower surface of a seating surface, such that the seating surface moves in a downward direction in response to pressure on the seating surface.

13. The assembly according to claim 12, wherein at least one of the upper connecting elements and at least one of the lower connecting elements are removably connected to their respective seating surfaces.

14. The assembly according to claim 12, wherein intermittent cyclic downward pressure causes a cyclic downward and upward spring action in the dual-hinged springs.

15. A dual-hinged spring assembly comprising:
a seat base separated a distance from a seating surface, wherein the distance includes:
dual-hinged spring assembly, comprising:
an elastomeric upper arc having an upper apogee including an upper connecting element connected to the seating surface, the elastomeric upper arc including:
a first upper strut assembly extending in a first direction from the upper connecting element and ending in a first downward upper base end; and
a second upper strut assembly extending in a second direction from the upper connecting element and ending in a second downward upper base end;
an elastomeric lower arc having a lower apogee including a lower connecting element connected to the seat base, the lower arc including:
a first lower strut assembly extending in the first direction from the lower connecting element and ending in a first upward lower base end which is rotatably connected to the first downward upper base end; and
a second lower strut assembly extending in the second direction from the lower connecting element and ending in a second upward lower base end which is rotatably connected to the second downward upper base end,
wherein the upper arc and lower arc each defining therein two triangular equilateral openings having a base with curved corners proximal to and parallel with the hinge, terminating in a curved apex proximal to the arc's center, such that when the lower connecting element is secured in position against a stabilizing surface, downward pressure causes the dual-hinged spring to compress.

16. The assembly according to claim 15, wherein intermittent cyclic downward pressure causes a cyclic downward and upward spring action in the dual-hinged springs.

17. The assembly according to claim 16, wherein: the first upper strut assembly and the second upper strut assembly each have a triangular cutout having an apex proximate to the upper connecting element; and the first lower strut assembly and the second lower strut assembly each have a triangular cutout having an apex proximate to the lower connecting element.

18. The assembly according to claim 16, including multiple dual-hinged spring assemblies arrayed in parallel configurations, each dual-hinged spring assembly having lower connecting elements attached to the upper surface of the seat base and each upper connecting element connected to the lower surface of the seating surface such that the seating surface provides spring action as a result of cyclic downward pressure on the seating surface.

* * * * *